United States Patent
Simpson et al.

(10) Patent No.: US 9,718,231 B2
(45) Date of Patent: *Aug. 1, 2017

(54) HIGH PRESSURE RELIEF ASSEMBLY AND ASSEMBLY LOCKING DEVICE FOR USE WITH EXTRUDERS

(71) Applicant: NESTEC SA, Vevey (CH)

(72) Inventors: Tyler Dean Simpson, Cuba, MO (US); Dwight E Howdeshell, II, Arnold, MS (US)

(73) Assignee: NESTEC SA, Vevey (CH)

( * ) Notice: Subject to any disclaimer, the term of this patent is extended or adjusted under 35 U.S.C. 154(b) by 135 days.

This patent is subject to a terminal disclaimer.

(21) Appl. No.: 14/322,189

(22) Filed: Jul. 2, 2014

(65) Prior Publication Data

US 2014/0314899 A1    Oct. 23, 2014

Related U.S. Application Data

(63) Continuation of application No. 13/515,845, filed as application No. PCT/US2010/003129 on Dec. 9, 2010, now Pat. No. 8,794,949.
(Continued)

(51) Int. Cl.
*B29C 47/08* (2006.01)
*B29C 47/12* (2006.01)
(Continued)

(52) U.S. Cl.
CPC .......... *B29C 47/12* (2013.01); *B29C 47/0822* (2013.01); *B29C 47/0864* (2013.01);
(Continued)

(58) Field of Classification Search
CPC ............ B29C 47/0822; B29C 47/0864; B29C 47/0866; B29C 47/0874; B29C 47/12; B29C 47/92; B29C 47/96
See application file for complete search history.

(56) References Cited

U.S. PATENT DOCUMENTS 1,947,202 A    2/1934  Homeier
2,078,100 A    4/1937  Royle
(Continued)

FOREIGN PATENT DOCUMENTS

| DE | 38 15 897 | 7/1989 |
| DE | 10 2005 007102 | 8/2006 |
| EP | 0630572 | 12/1994 |
| FR | 2 409 144 | 6/1979 |
| JP | H08 258114 | 10/1996 |
| WO | 2004/001970 | 12/2003 |

OTHER PUBLICATIONS

International Search Report & Written Opinion for PCT/US10/03129 dated Feb. 25, 2011.
EP Search Report to Appl. No. 10838016.3 dated Mar. 12, 2015.

*Primary Examiner* — Alison L Hindenlang
*Assistant Examiner* — Joseph Leyson

(57) ABSTRACT

The invention provides devices that are attached to an extruder making the operation thereof more efficient and convenient and allowing for a quick change over of parts used to make various products prepared in the extrusion process. A high pressure relief assembly is attached to the extruder that allows for the rapid release of pressure from the extruder at the end of the process by venting product under pressure from the extruder and the extruder also has attached thereto a quick assembly locking device that allows for the exchange of assemblies, such as a density control assembly and other assembles, without the removal of nuts, bolts, and clamps by attaching the assembly to an arm that can be moved in and out of place in front of the extruder and wherein the device has a locking mechanism that seals and releases the assembly from the extruder.

17 Claims, 6 Drawing Sheets

Related U.S. Application Data

(60) Provisional application No. 61/284,487, filed on Dec. 18, 2009.

(51) Int. Cl.
    *B29C 47/96*     (2006.01)
    *B29C 47/92*     (2006.01)
    *B29C 47/30*     (2006.01)
    *B29C 47/00*     (2006.01)

(52) U.S. Cl.
CPC ...... *B29C 47/0866* (2013.01); *B29C 47/0874* (2013.01); *B29C 47/30* (2013.01); *B29C 47/92* (2013.01); *B29C 47/96* (2013.01); *B29C 47/0009* (2013.01); *B29C 2947/926* (2013.01); *B29C 2947/92019* (2013.01); *B29C 2947/92409* (2013.01); *B29C 2947/92685* (2013.01); *B29C 2947/92904* (2013.01)

(56) References Cited

U.S. PATENT DOCUMENTS

| | | | |
|---|---|---|---|
| 2,399,536 A * | 4/1946 | Baum | B23P 19/00 |
| | | | 269/142 |
| 3,632,279 A | 1/1972 | Christy | |
| 3,677,671 A * | 7/1972 | Martin | B22F 5/08 |
| | | | 425/418 |
| 3,833,247 A | 9/1974 | Puskas | |
| 4,685,875 A | 8/1987 | Chevroulet et al. | |
| 4,984,977 A * | 1/1991 | Grimminger | B29C 47/0016 |
| | | | 425/145 |
| 5,238,385 A | 8/1993 | Johnson | |
| 5,720,987 A | 2/1998 | Ploog et al. | |
| 8,794,949 B2 * | 8/2014 | Simpson | B29C 47/0822 |
| | | | 425/145 |

* cited by examiner

HIGH PRESSURE RELIEF ASSEMBLY AND ASSEMBLY LOCKING DEVICE FOR USE WITH EXTRUDERS

CROSS REFERENCE TO RELATED APPLICATIONS

This application is a continuation of U.S. application Ser. No. 13/515,845 filed Jun. 14, 2012, which is a national stage application under 35 U.S.C. §371 of PCT/US2010/003129 filed Dec. 9, 2010, which claims priority to U.S. Provisional Application Ser. No. 61/284,487 filed Dec. 18, 2009, the disclosures of which are incorporated herein by reference in their entireties.

BACKGROUND OF THE INVENTION

Field of the Invention

The present invention relates generally to devices used to produce extruded products and particularly to devices that are attached to extruders to make the operation thereof more efficient and convenient and devices that allow for locking and a quick change over of devices attached to extruders.

Description of Related Art

Extruders for making food products generally operate at relatively high temperatures that cook the products during the extrusion process. During such a process, pressures as high as 300 to 800 psi build up in the barrel of the extruder. Such an extruder is often referred to as an extruder-cooker. When the extruder-cooker has to be shut down, for example, for maintenance or a change over at the end of an operation, the high pressure needs to be relieved safely before performing any other activity on the extruder-cooker, such as die assembly or screw removal. Currently, the methods used to safely relieve the high pressure involve slowly dissipating the pressure over time. This method helps avoid injury to operators from exploding debris, such as loose parts or product, for example, if the extruder is opened to quickly at the end of an operation.

Attempts to solve this problem have been made but have not been acceptable. For example, reference WO 2004/01970 A2 discloses a back pressure valve that is positioned directly in the material flow path. But such a valve is prone to unanticipated variations in the density of the product and to material backing up and plugging of the extruder. In another example, U.S. Pat. No. 4,984,977 discloses a device that may be moved in or out of the flow path of the product. This also risks plugging and as well as trapping material, which presents sanitation and cross contamination issues. In yet another example, U.S. Pat. No. 5,238,385 discloses a Y-Valve Assembly that relieves pressure by diverting the material flow. However, it extends the extruder foot print and requires additional product removal equipment, which is costly and reduces flexibility for incorporating additional processing steps, such as co-extrusion.

Also, in a typical food extrusion process, one or more assemblies or sub-assemblies are attached to the exit end of the extruder to create products with desired characteristics. These assemblies and sub-assemblies may serve, for example, to vary density of a product; expand the product; shape and cut the product e.g., into kibbles; or co-extrude different-colored or textured products. The weight of each of these assemblies and sub-assemblies may vary from approximately 120 lbs to as much as 300 lbs. Some assemblies or sub-assemblies may be fastened to the extruder body or to each other, for example, by bolts or bolts and nuts. Another method uses heavy clamps (50 to 120 lbs) that are locked by bolts and nuts.

Attaching the heavy assemblies and sub-assemblies to the extruder and detaching them from the extruder is time consuming and requires heavy lifting equipment. Often, multiple personnel are needed to complete operations requiring removal, replacing, or adding such devices to the extrusion line. Due to the large number of bolts, there is frequent stripping of bolts leading to high replacement costs. Further, changing such hot, wet and heavy parts creates a high-risk environment for injuries, such as back injuries or injuries caused by, for example, slippage and dropping of heavy parts on fingers or toes of the personnel involved.

There is, therefore, a need for new devices and methods for overcoming these limitations and problems. The present invention provides a solution to these problems and overcome the limitations inherent in current devices.

SUMMARY OF THE INVENTION

It is, therefore, an object of this invention to provide a new high pressure relief assembly that is attached to an extruder that rapidly relieves pressure built up in an extruder during its operation and also removes any extrudate from the internal cavity of the extruder in a safe and controlled fashion.

It is another object of this invention to provide an assembly locking device that is attached to the extruder in such a manner so as to facilitate rapid attachments and holding of assemblies and sub-assemblies in place during the operation of the extruder and removal of such assemblies and sub-assemblies that require frequent changing in the normal operation of an extruder.

It is a further object of this invention to provide a combination of a new high pressure relief assembly and an assembly locking device that allows for the rapid reduction of pressure and the quick removal of and replacement of assemblies and sub-assemblies at the completion of the operation of an extruder.

It is another object of this invention is to provide a method of using the combination of a new high pressure relief assembly and locking device in the operation of an extruder.

One or more of these objects are achieved by the use of a novel high pressure relief assembly, by the use of a novel an assembly locking device, or a combination thereof. The assembly and/or device are attached to an extruder in a manner that permits the relatively quick release of pressure from an extruder and significantly expedites the change of devices that affect the characteristics of extruded products.

In one aspect, the invention provides a high-pressure relief assembly suitable for attachment to an extruder useful for the extrusion of product, the extruder having a barrel housing with an extruder bore, an extrusion means such as a screw or piston positioned in the bore, wherein the high pressure relief assembly comprises a face plate having a defined circular opening attached to the end of the bore, where the defined opening of the face plate is in alignment with the extruder bore and having a top and bottom portion and a piston chamber bore and a product discharge port being positioned in the bottom portion of the face plate and having the piston chamber bore and the product discharge port intersecting each other;

a first valve assembly having a valve body with a distal end and a proximal end and a piston having a locking groove positioned in the valve body movable in the piston chamber bore from an open position to a closed position and having the proximal end of the valve body attached at the piston chamber bore at the bottom portion of the face plate;

a first linear actuator attached to the distal end of the valve body of the first valve assembly being in contact with the piston and when the actuator is activated, the piston is moved to a closed position by pushing the piston from its original open position in the piston chamber bore and partially into the circular opening defined by the face plate that is in alignment with the extruder bore thereby blocking the product discharge port and preventing product from flowing out through the product discharge port and when the actuator is deactivated the piston is moved to its original open position; and means for locking the piston in its closed position by engaging these means with the piston, whereby when the first linear actuator is activated, the piston is moved to the closed position and when the means for locking the piston in its closed position, the piston is held in the closed position and whereby when pressure is to be relieved from the extruder, the means for locking the piston is deactivated and then the first linear actuator is deactivated, the piston is moved to the open position thereby allowing product to flow out through the product discharge port and relieving pressure in the extruder.

In another aspect, the invention provides an assembly locking device suitable for an extruder that can be used alone or preferably in conjunction with the above described high pressure release assembly. A suitable extruder for forming a product comprises a barrel housing with an extruder bore, an extrusion means such as a screw or piston positioned in the bore for the extrusion of product and a face plate attached to the end of the bore having a circular opening centered on the bore forming a mechanical stop and having a first assembly locking device attached to the face plate that holds and locks in place an assembly used for the extrusion of product and wherein the assembly locking device defines an opening larger than the circular opening of the face plate and comprises:

a linear drive assembly having an open and closed position;

a linear gear rack linearly positioned and in contact with the linear drive assembly whereby the linear drive assembly moves the gear rack from an open to closed position;

a circular scroll gear with a scroll thread centered on the circular opening of the assembly locking device and wherein the scroll gear is in engagement with the linear gear rack; and at least one internal jaw having a thread area that meshes with the thread of the scroll thread and thereby the internal jaw is driven by the scroll gear to an engaged position thereby firmly holding and locking in place the assembly for extrusion of product adjacent to the mechanical stop, wherein when the scroll gear is driven by the linear gear rack to the closed position thereby holding and locking the assembly for the extrusion of product in place and when the scroll gear is driven to the open position, it releases this assembly.

Optionally, a second, third and or more additional assembly locking devices can be attached to the extruder with each having a different assembly or device attached for the extrusion of product, such as, a density control assembly, a color or dye injector assembly, a dough injector assembly, a crimping wheel or other assemblies or devices for controlling product properties. In such a situation, the second locking device is mounted adjacent to the face place on a movable arm assembly and with the device attached, such as a density control device, is moved and centered on the first assembly locking device which locks the assembly in this case the density control assembly in place and then a die assembly and cutting knife assembly are positioned, centered and held in place. A third and fourth assembly locking devices can be attached in such a manner each having a different assemblies or devices attached for production of a product.

Other and further objects, features, and advantages of the invention will be readily apparent to those skilled in the art.

DETAILED DESCRIPTION OF THE INVENTION

Figure 1:
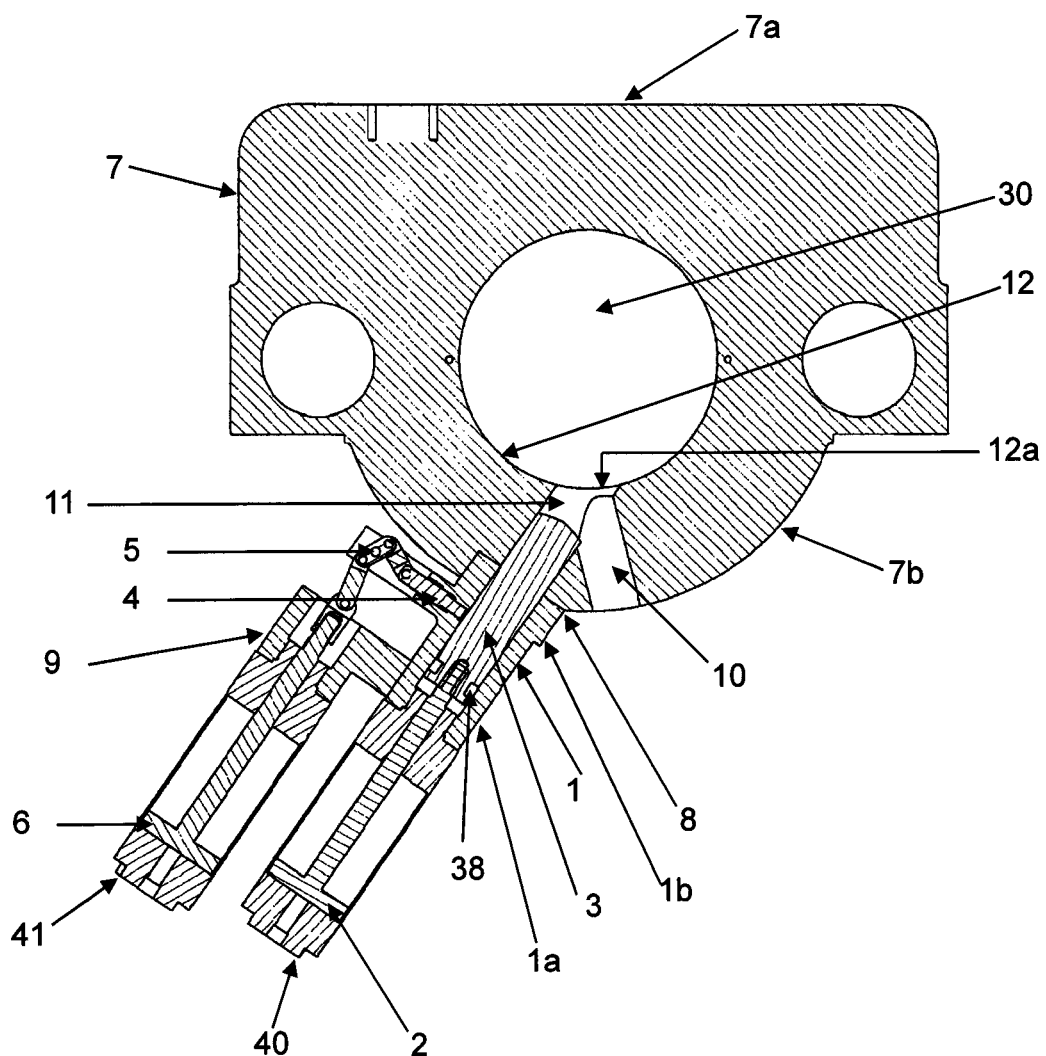
FIG. 1 is a cross-section through the end-plate that is attached to the extruder barrel and through the high pressure relief assembly attached thereto.

As used herein, ranges are used as shorthand to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a method", or "a food" includes a plurality of such "methods", or "foods." Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The term "comprising" is intended to include embodiments encompassed by the terms "consisting essentially of" and "consisting of". Similarly, the term "consisting essentially of" is intended to include embodiments encompassed by the term "consisting of".

The methods and compositions and other advances disclosed herein are not limited to particular equipment or processes described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides a high-pressure relief assembly. The high-pressure relief assembly is attached and positioned on an extruder. The assembly rapidly relieves the pressure as well as removes the extrudate from the internal cavity of the extruder. This is accomplished (1) in a safe and controlled fashion and (2) without changing density or flow of extrudate. The assembly neither obstructs the extrudate path to die openings nor affects the product density, cosmetics, or texture of the extrudate. Further, the assembly does not change the location, length, or direction of extrudate flow. The assembly can be installed and operated independently of the normal extruder shut down procedure.

In another aspect, the invention provides an assembly locking device that expedites removing and replacing heavy assemblies or sub-assemblies on an extruder. The device solves the problem of removing and replacing heavy assemblies or sub-assemblies required in an extrusion process. Such device can be attached and positioned to the extruder in such manner so as to facilitate rapid attachment and holding of assemblies in-place during operation, and removal of these assemblies and sub-assemblies that require frequent changing in the normal course of operation. Thus, a need for clamps, bolts, nuts and heavy lifting is eliminated.

Furthermore, the high pressure relief assembly may be used in combination with the assembly locking device to provide for the rapid removal and replacement of heavy assemblies or sub-assemblies required for the extrusion process. The change-over of such assemblies can be completed in 1 to 10 minutes, preferably in 3 to 5 minutes, compared to the 45 to 60 minutes required by known methods. This combination provides for the efficient operation of the extruder.

Figure 2:
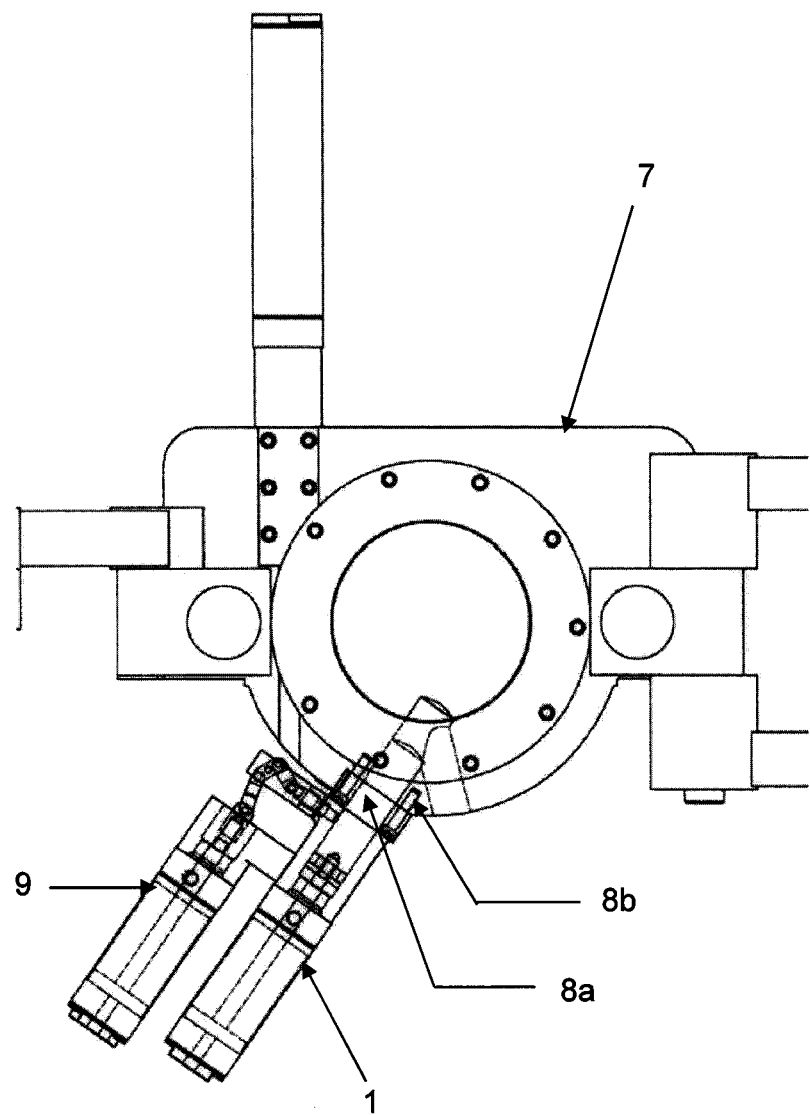
FIG. 2 is a schematic drawing showing the high pressure relief assembly attached to the face plate of an extruder.

FIG. 1 shows a cross-section through the end-plate that is attached to the extruder barrel and through the high pressure relief assembly attached thereto. FIG. 2 is a schematic drawing showing the high pressure relief assembly attached to the face plate of an extruder.

As shown in FIG. 1, a face plate (7) is attached to the end of the bore (30) of an extruder (not shown). The face plate (7) has a circular center opening that is in alignment with the center of the bore (30) of the extruder and has a top portion (7a), a bottom portion (7b), and a piston chamber bore (11) positioned at about the 7 o'clock position of the face plate (7). The face plate (7) also includes a product discharge port (10), positioned in the bottom portion (7b) of the face plate (7) at about the 5 o'clock position. The piston chamber (11) and the product discharge port (10) intersect each other (12a). During operation of the high-pressure relief assembly, when in the closed position, the piston (3) in the piston chamber (11) extends into the circular center opening defined by the face plate (7) that is in alignment with the bore (30), i.e., the exterior bore perimeter (12) of the extruder and prevents product being made in the extruder from exiting the product discharge port (10). As a result, the product is forced out of the extruder through the typical passage having an extrusion die, product control devices, and a cutting mechanism. Upon activation of the high-pressure relief assembly, the piston (3) is moved to its open position thereby allowing product and any pressure built up in the extruder to exit out through the product discharge port (10).

A first valve assembly (40) having a valve body (1) with a distal end (1a) and a proximal end (1b) and a piston (3) having a locking groove (38) is positioned in the valve body (1). The piston (3) is movable from an open position to a closed position and having the proximal end (1b) of the valve body (1) attached at the piston chamber (11) in the bottom portion (7b) of the face plate (7) at the 7 o'clock position with a mounting bracket (8) that is attached to a mounting flange (8a), see FIG. 2, and four fasteners, typically bolts, (8b), see FIG. 2 at the bottom side of the face plate (7).

A first linear actuator (2) is attached to the distal end (1a) of the valve body (1) of the first valve assembly (40) and is in direct contact with the piston (3). When the actuator (2) is activated, it moves the piston (3) to a closed position by pushing the piston (3) from its original open position into the chamber bore (11) and partially into the central opening of the face plate (7) that is in alignment with extruder bore (30), thereby blocking the product discharge port (10) and preventing product from flowing out through the discharge port (10). When the actuator (2) is deactivated, the piston (3) is moved to its original open position, which allows product and pressure built up in the extruder bore to exit the extruder bore (30) out through the product discharge port (10).

The means for locking the piston in its closed position when activated and when deactivated allowing the piston to move to its open position preferably comprises the following: a second valve assembly (41) and a second actuator (6) coupled via a linking means (5) to a lock pin (4) that is inserted into groove (38) in piston (3) when activated and thereby holding the piston (3) in its closed position and when the means is deactivated the lock pin (4) is disengaged from the piston (3) and piston (3) is moved to its open position by actuator (2).

These means are described more clearly in FIG. 1. A second valve assembly (41) having a valve body (9) is attached to the valve body (1) of the first valve assembly (40) and has a second linear actuator (6) attached to the valve body (9). A linking means (5), typically pivotally connected links, is attached to the second linear actuator (6) of the second valve assembly (41) and a lock pin (4) is attached to the linking means (5) and positioned in an engaging relationship to the piston (3) of the first valve assembly (40). This prevents the valve from opening during operation in event of a pressure spike.

When the first linear actuator (2) is activated, the piston (3) is moved to the closed position and when the second linear actuator (6) is activated, the lock pin (4) engages with the locking groove (38) of the piston (3) of the first valve assembly (40) and holds piston (3) in the closed position. When pressure is to be relieved from the extruder, the second linear actuator (6) is deactivated and the lock pin (4)

is moved out of the locking groove (38) of the piston (3). The first linear actuator (2) is deactivated thereby moving the piston (3) of the first valve assembly (40) to the open position thereby allowing product to flow out through the product discharge port and rapidly reducing pressure built up in extruder during the extrusion process to atmospheric pressure. After the pressure is released, any equipment attached to the exit of the extruder, such as the die assembly can then be removed without risk of an explosion.

The linear actuators (2) and (6) can be powered by conventional means, such as by compressed air or fluid hydraulic pressure or by motorized drive. Control of the entire process may be automated, manual, or a combination thereof.

Figure 3:
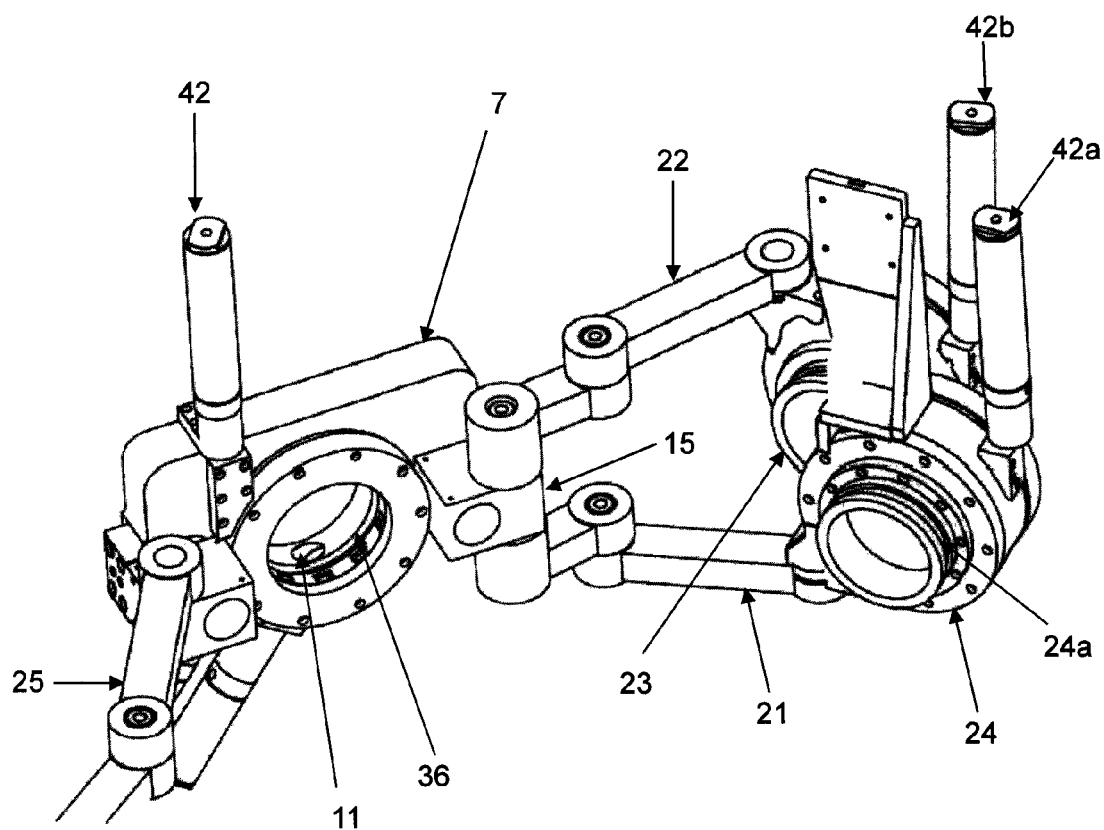
FIG. 3 is a schematic drawing of an assembly locking device attached to a face plate of an extruder with additional moveable arms having attached thereto device, such as a density control assembly, for positioning in the assembly locking device attached to the face plate of the extruder.
Figure 4:
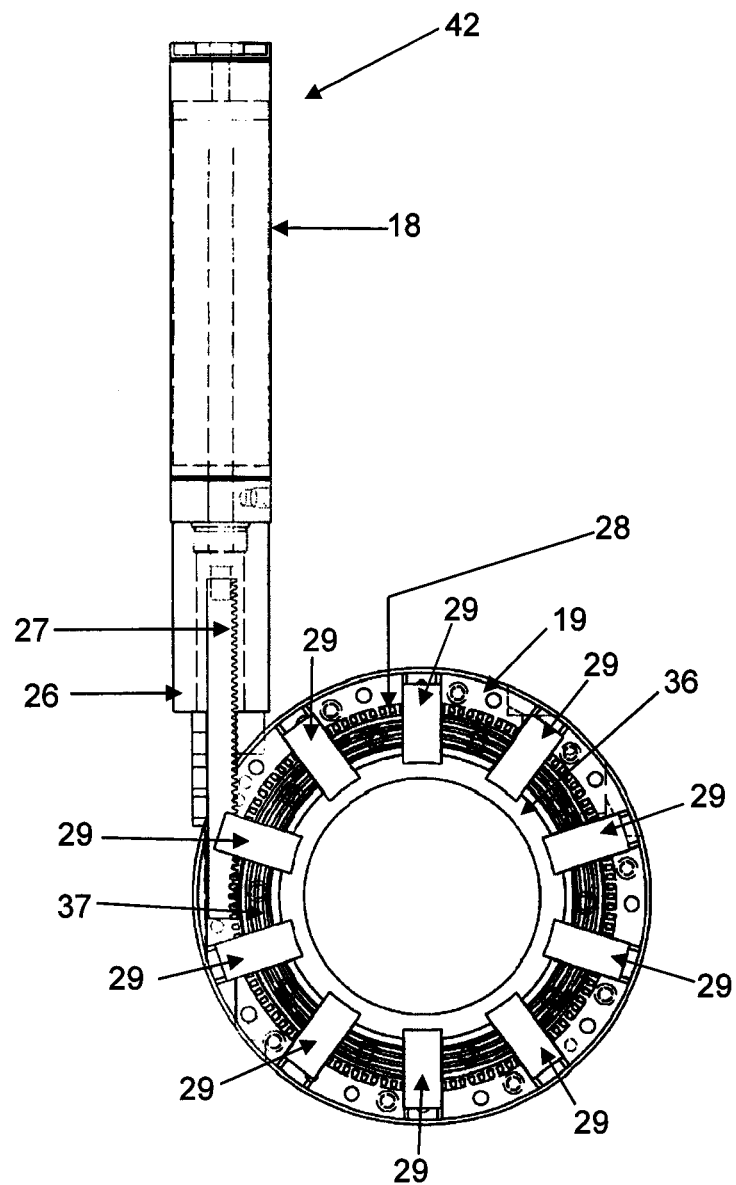
FIG. 4 is a schematic drawing showing a front view of the assembly locking device with a cover plate removed to show the scroll gear and jaw mechanism.
Figure 5:
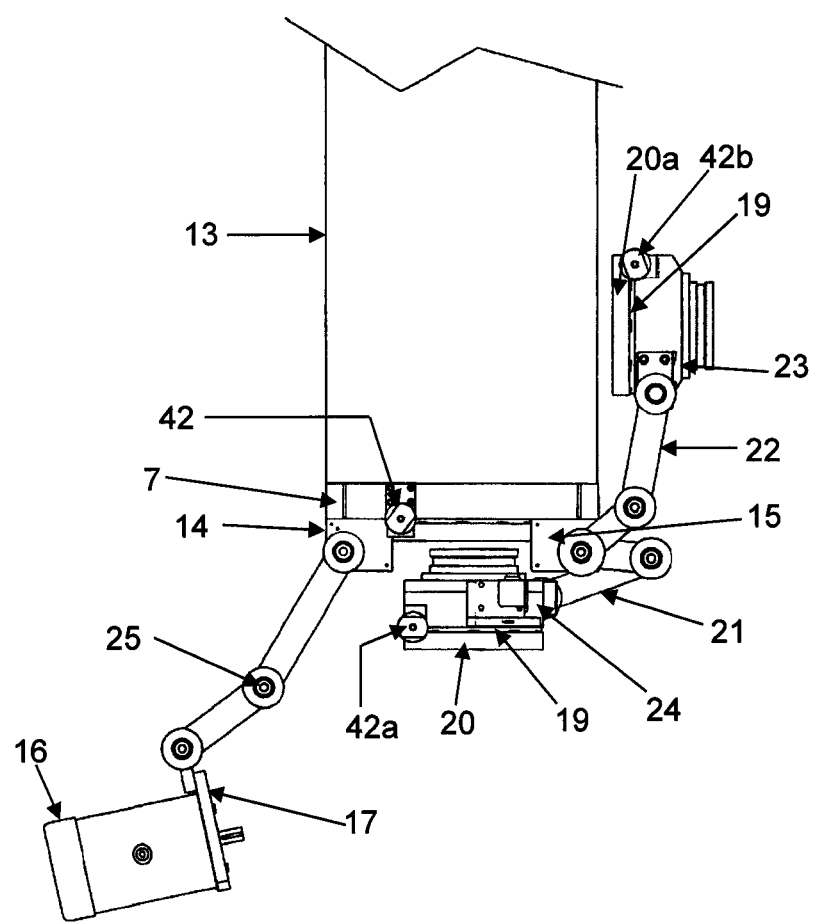
FIG. 5 is a schematic top view of the extruder system set up having multiple assembly locking devices positioned thereon.
Figure 6:
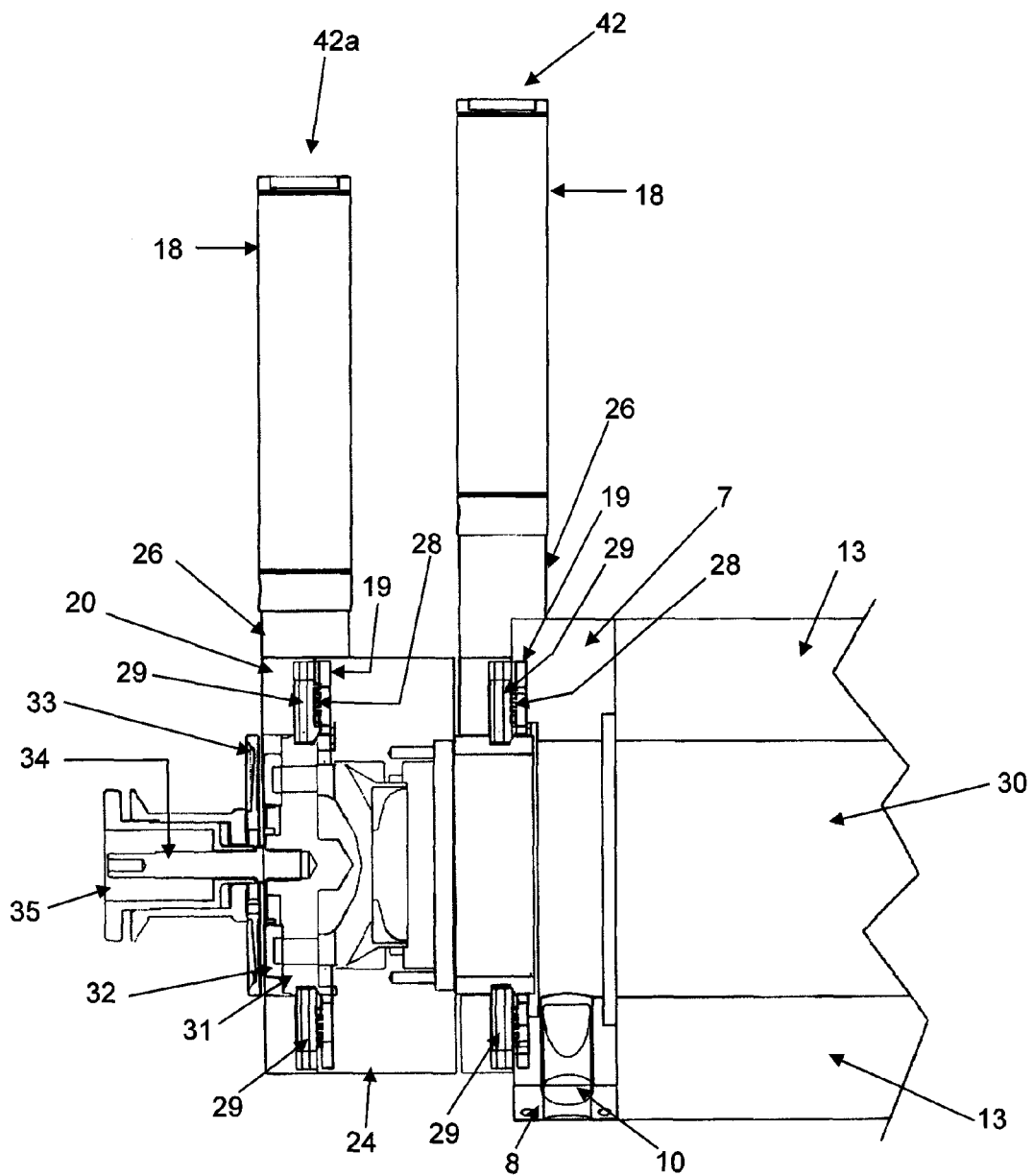
FIG. 6 is a schematic longitudinal section view of a set up of an extruder having two assembly locking devices positioned thereon.

FIGS. 3 to 6 are schematic drawings showing the assembly locking device. FIG. 3 is a schematic drawing of an assembly locking device attached to face plate (7) of an extruder (not shown) with additional moveable arm assemblies (21) and (22) each having attached thereto an assembly, such as a density control assembly, that can be positioned in the assembly locking device attached to the face plate (7) of the extruder. FIG. 4 shows the front view of the assembly locking device with the cover plate removed showing the scroll gear and jaw mechanism. FIG. 5 is the top view of an extruder barrel set up with an assembly locking devices and other assemblies. FIG. 6 shows a longitudinal section view of a set up with the extruder and two assembly locking device in-place.

The following is a description of the essential components of the assembly locking device and its mechanism of operation. As shown in FIG. 3, the assembly locking device (42) is mounted permanently on the face plate (7) and additional assembly locking devices (42a) and (42b) can be mounted on hinged arms (21) and (22) respectively attached to the base of the wall surrounding the bore of other assemblies, like a density control assembly. Further, the bore of the assembly locking device, for example, (42a) is larger than the bore of the assembly to which it is attached (24), a lip is formed. This is the mechanical stop for this assembly. Similarly, a mechanical stop is formed when assembly locking device (42b) is attached to assembly (23). When more than one assembly locking device is used, this is the usual arrangement.

FIG. 3 shows the assembly locking device (42) permanently attached to the face plate (7). Two additional assembly locking devices (42a) and (42b) are attached to right hinge block (15) via hinge arm assemblies (21) and (22). Attached to the lower hinge arm assembly (21) is a density control assembly (24) which when moved into the central opening of the assembly locking device (42) and adjacent to the mechanical stop (36) is locked into place by assembly locking device (42) which firmly the tapered flange (24a) of the density control assembly (24). Similarly, an additional assembly (23), e.g., a color or die injector assembly, can be attached to the hinge block (15) via upper hinge arm assembly (22) which is moved and locked into the assembly locking device (42a) attached to the density control assembly (24) and locked in place. An assembly of a die ring holder (31), die ring (32) fastened to a cutting assembly comprising a cutting knife (33), knife support shaft (34) and knife motor coupling (35) (all shown in FIG. 6) is manually centered and positioned in assembly (24) against its mechanical stop. Moveable hinge arm assembly (25) attached to the left hinge block (14) having a motor and hood plate with a knife motor attached thereto (see FIG. 5) is swung into place and engages with the knife motor coupling thereby driving the cutting knife when the extruder is in operation.

As shown in FIG. 4, the assembly locking device (42) comprises a linear drive assembly (18) that has an open and closed position and is in contact with a linear gear rack (27) positioned in a drive mount (26) attached to the face plate (7) shown in FIG. 5. The linear gear rack (27) that is linearly positioned and in contact with the linear drive assembly (18) is moved by the linear drive assembly (18), which moves the gear rack (27) from an open to closed position and from a closed to an open position.

A circular scroll gear (28) with a scroll thread (37) is centered on the central opening of the face plate of the extruder and is in engagement with the linear gear rack (27). There is at least one internal jaw (29) and preferably four and up to and including ten internal jaws (29) each have a thread area that meshes with the thread of the scroll thread (37). The internal jaws (29) are driven by the scroll gear (28) to an engaged position locking an assembly positioned in the center of the assembly locking device.

The assembly locking device can be attached to a variety of devices or assemblies; for example, FIG. 5 shows a density control device (24) for controlling density of the product being made and another device (23) such as a color or dye injector assembly each having an assembly locking device attached thereto.

Upon completion of a product run and when changes need to be made, pressure is released via the high-pressure relief assembly and the assembly locking devices attached to the extruder can be quickly disengaged and the assemblies to which the assembly locking device are attached can be moved, exchanged, or cleaned. The opening of the assembly locking device (42) is accomplished by the linear drive assembly (18), which is driven upward to its open position, which in turn moves the scroll gear (28) in the clockwise direction causing the jaws (29) to release and thereby releasing an assembly or device that has been locked in place.

The assembly locking device described above eliminates the need for clamps, bolts, nuts, and similar devices needed to attach heavy assemblies required to make desired products. To avoid having to carry the assemblies towards and away from the working position, they are mounted directly to the extruder on free swinging hinged arms as shown in FIG. 5. This allows one person to move the parts in and out of position with minimal effort and no lifting. Further, this allows for proper cleaning and sanitation of equipment.

As shown in FIG. 5, multiple assembly locking devices (42), (42a) and (42b) can be attached to the extruder barrel housing (13) with each attached to a different assembly, such as, a density control assembly (24). In a typical arrangement as shown, a density control assembly (24) attached to lower hinge arm assembly (21) moveably attached to right hinge block (15) is held in contact with the mechanical stop (36), not shown, of the face plate (7) by assembly locking device (42). An additional assembly (23) for controlling the properties of the product being made and having assembly locking device (42b) attached is attached to the right hinge block (15) via moveable upper arm assembly (22) and is moved to be in contact with the mechanical stop of the density control assembly (24) and held in place by assembly locking device (42a). An assembly of a die ring holder (31), die ring (32), cutting knife (33), knife support shaft (34) and knife motor coupling (35) (all shown in FIG. 6) is manually centered and positioned in assembly (23) against its mechanical stop and the assembly locking device (42b) is activated to hold it in place. Moveable hinge arm assembly (25) attached to the left hinge block (14) having a knife motor (16) and hood mount plate (17) attached thereto is swung into place and engages with the knife motor coupling thereby driving the cutting knife when the extruder is in operation completing the total assemblies as shown.

FIG. 6 illustrates an extruder having a density control assembly (24) attached via assembly locking device (42a) and cutting knife and motor assembly also attached thereto. The extruder has an extruder barrel (13) and extruder bore (30) with face plate (7) positioned over the bore (30). The face plate (7) has a product discharge port (10) and shows a mounting bracket (8). The linear drive assembly (18) of assembly locking device (42) is attached to drive mount (26) which is attached to face plate (7). Jaw plate (19) is attached to face plate (7) and scroll gear (28) is in engagement with the jaw (29). Density control assembly (24) is positioned and locked in place by assembly locking device (42). Assembly locking device (42a) has linear drive assembly (18) attached to drive mount (26) which is fastened to jaw-retaining plate (20). The jaw-retaining plate (20) is held in place and against the density control assembly (24). Scroll gear (28) is in engagement with jaw (29). The die ring holder (31) with the die ring (32) is attached to the cutting assembly which comprises the cutting knife (33), the knife support shaft (34) and the knife motor coupling (35) and is positioned in the bore of assembly locking device (42a) against the mechanical stop of the density control device (24) as shown in FIG. 6. The knife motor (16) shown in FIG. 5 is swung into position and engaged with the knife (33) via the knife motor coupling (35).

Operation of the High Pressure Relief Assembly and Assembly Locking Device

In the operation of the high pressure relief assembly, referring to FIG. 1 and FIG. 2, the assembly is activated thereby moving piston (3) into the opening in the face plate (7) thereby blocking the discharge port (10) and lock pin (4) is moved into piston locking groove (38) preventing piston (3) from opening due to pressure that is built up in the extruder bore. At the end of a run for the production of product, pressure is rapidly relieved by disengaging the lock pin (4) and moving the piston to its original position thereby opening the product discharge port (10) thereby removing product from the extruder and rapidly reducing the pressure built up in the extruder to atmospheric pressure.

In the operation of an extruder with the assembly locking device, the desired assembly, for example, a density control assembly (24) in FIG. 3 which is mounted on a hinged arm, is moved into the center of assembly locking device (42) attached to face plate (7) until it is stopped by mechanical stop (36). The tapered and grooved flange (24a) of the density control assembly (24) is locked in place by assembly locking device (42) by forcing the assembly towards the mechanical stop (36) thereby forming a proper seal.

Referring to FIG. 4, in the operation of the assembly locking device (42), when the linear drive (18) is activated, it is moved from an open position downward to a closed position. The linear drive (18) may be driven by air or hydraulic pressure or by direct motorized drive. Linear drive (18) then moves an internal linear gear rack (27) that rotates a scroll gear (28) having a scroll thread (37) on the face of the gear that matches up to the thread on the back of each internal jaw (29). This moves the jaws in towards the center of the opening. In doing so, the jaws push against an assembly positioned therein such as the taper on the flange of a density control assembly as discussed above and forces the assembly towards the mechanical stop formed by the face plate and seals the assembly in place. To release an assembly the process is reversed, that is, the linear drive (18) moves upwards thereby reversing the linear (27) which in turn moves the scroll gear (28) in the clockwise direction causing the jaws to move outwards releasing the assembly.

The assembly locking device preferably is used in conjunction with the high pressure release assembly. At the end of a product run, the high pressure in the extruder is released by activating the high-pressure relief assembly. When the pressure approaches the atmospheric pressure, the assembly locking device is activated, and assemblies, such as the density control assembly, are swung away from the bore and any other assemblies that are in use. Upon restart, these assemblies are moved back into position and locked in place. Again, as previously pointed out, there is no lifting, or attaching parts and assemblies with bolts, nuts or clamps and the operation is rapid and safe.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

What is claimed is:

1. A high-pressure relief assembly comprising:
   a face plate configured to attach to an extruder bore and comprising a product discharge port;
   a first valve assembly comprising a valve body and a piston, the piston comprises a locking groove positioned in the valve body; and
   a locking member configured to engage the piston to lock the piston in a closed position in which the piston blocks the product discharge port.

2. The high pressure relief assembly of claim 1 wherein the face plate comprises an opening, and the face plate is configured to attach to the extruder bore with the opening in alignment with the extruder bore.

3. The high pressure relief assembly of claim 1 wherein the face plate comprises a piston chamber bore that intersects the product discharge port.

4. The high pressure relief assembly of claim 3 comprising a first linear actuator engaged with the piston and attached to a distal end of the valve body, and a proximal end of the valve body is attached to the piston chamber bore.

5. The high pressure relief assembly of claim 4 wherein the first linear actuator is configured to move the piston to the closed position by pushing the piston into the piston chamber bore and partially into an opening defined by the face plate.

6. The high pressure relief assembly of claim 5 wherein deactivation of the first linear actuator moves the piston from the closed position to an open position in which the product discharge port is accessible to the opening defined by the face plate.

7. The high pressure relief assembly of claim 1 wherein the locking member comprises a lock pin that engages the locking groove of the piston to hold the piston in the closed position.

8. The high pressure relief assembly of claim 7 wherein the locking member comprises a second linear actuator that is deactivated to move the lock pin out of the locking groove of the piston.

9. An assembly locking device comprising:
a linear drive assembly configured to move a linear gear rack;
a circular scroll gear engaged with the linear gear rack and comprising a scroll thread; and
internal jaws comprising a thread area that meshes with the scroll thread, the internal jaws are configured to be driven by the scroll gear to an engaged position in which the internal jaws hold an assembly configured for the extrusion of product.

10. The assembly locking device of claim 9 wherein the linear gear rack is linearly positioned in contact with the linear drive assembly.

11. The assembly locking device of claim 9 wherein the scroll gear is driven to an open position to release the internal jaws such that the assembly configured for the extrusion of product is removable from the locking device.

12. An extruder comprising:
a barrel housing comprising an extruder bore;
an extrusion member positioned in the extruder bore;
a high pressure relief assembly comprising a face plate attached to an end of the extruder with an opening of the face plate aligned with the extruder bore, the high pressure relief assembly comprising a product discharge port downstream from the opening;
a first valve assembly comprising a valve body and a piston;
a locking member configured to lock the piston in a closed position in which the piston blocks the product discharge port, by engaging the piston; and
an assembly locking device attached to the face plate and comprising:
(i) a linear drive assembly configured to move a linear gear rack;
(ii) a circular scroll gear engaged with the linear gear rack and centered on the opening of the face plate; and
(iii) internal jaws that mesh with the scroll gear.

13. The extruder of claim 12 wherein the high pressure relief assembly comprises a piston chamber bore that intersects the product discharge port.

14. The extruder of claim 13 comprising a first linear actuator engaged with the piston and attached to a distal end of the valve body, and a proximal end of the valve body is attached to the piston chamber bore.

15. The extruder of claim 12 wherein the circular scroll gear comprises a scroll thread that meshes with a thread area of the internal jaws.

16. An extruder comprising:
a barrel housing comprising an extruder bore;
an extrusion member positioned in the extruder bore;
a high pressure relief assembly comprising a face plate attached to an end of the extruder with an opening of the face plate aligned with the extruder bore, the high pressure relief assembly comprising a product discharge port downstream from the opening, the high pressure relief assembly comprises a piston chamber bore that intersects the product discharge port;
a first valve assembly comprising a valve body and a piston;
a locking member configured to lock the piston in a closed position in which the piston blocks the product discharge port, by engaging the piston; and
a first linear actuator engaged with the piston and attached to a distal end of the valve body, a proximal end of the valve body is attached to the piston chamber bore, and the first linear actuator is configured to move the piston to the closed position by pushing the piston into the piston chamber bore and partially into the opening of the face plate.

17. An extruder comprising:
a barrel housing comprising an extruder bore;
an extrusion member positioned in the extruder bore;
a high pressure relief assembly comprising a face plate attached to an end of the extruder with an opening of the face plate aligned with the extruder bore, the high pressure relief assembly comprising a product discharge port downstream from the opening, the high pressure relief assembly comprises a piston chamber bore that intersects the product discharge port;
a first valve assembly comprising a valve body and a piston;
a locking member configured to lock the piston in a closed position in which the piston blocks the product discharge port, by engaging the piston; and
a first linear actuator engaged with the piston and attached to a distal end of the valve body, a proximal end of the valve body is attached to the piston chamber bore, the piston comprises a locking groove positioned in the valve body, the locking member comprises a lock pin that engages the locking groove of the piston to hold the piston in the closed position, and the locking member further comprises a second linear actuator that is deactivated to move the lock pin out of the locking groove of the piston.

* * * * *